United States Patent
Darshan

(10) Patent No.: US 8,149,602 B2
(45) Date of Patent: Apr. 3, 2012

(54) METHOD AND APPARATUS FOR DETECTING END OF START UP PHASE

(75) Inventor: Yair Darshan, Petach Tikva (IL)

(73) Assignee: Microsemi Corp.-Analog Mixed Signal Group, Ltd., Hod Hasharon (IL)

( * ) Notice: Subject to any disclaimer, the term of this patent is extended or adjusted under 35 U.S.C. 154(b) by 518 days.

(21) Appl. No.: 12/408,739

(22) Filed: Mar. 23, 2009

(65) Prior Publication Data
US 2009/0243565 A1    Oct. 1, 2009

Related U.S. Application Data

(60) Provisional application No. 61/039,831, filed on Mar. 27, 2008.

(51) Int. Cl.
- H02M 1/00 (2007.01)
- G05F 1/569 (2006.01)
- G05F 1/40 (2006.01)

(52) U.S. Cl. .......... 363/49; 323/276; 323/284; 323/901; 323/908

(58) Field of Classification Search .............. 363/49; 323/238, 276, 277, 284, 285, 321, 901, 908
See application file for complete search history.

(56) References Cited

U.S. PATENT DOCUMENTS

| | | | |
|---|---|---|---|
| 5,666,044 A * | 9/1997 | Tuozzolo | 323/277 |
| 6,473,608 B1 | 10/2002 | Lehr et al. | |
| 6,643,566 B1 | 11/2003 | Lehr et al. | |
| 6,650,554 B2 * | 11/2003 | Darshan | 363/46 |
| 7,078,885 B2 * | 7/2006 | Prexl | 323/277 |
| 7,145,439 B2 | 12/2006 | Darshan et al. | |
| 7,355,416 B1 * | 4/2008 | Darshan | 324/713 |
| 7,500,121 B2 | 3/2009 | Langer | |
| 7,538,528 B2 * | 5/2009 | Heath | 323/274 |
| 7,554,783 B2 * | 6/2009 | Heath et al. | 361/93.1 |
| 2004/0158167 A1 | 8/2004 | Smith et al. | |
| 2006/0023475 A1 * | 2/2006 | Sherwood et al. | 363/49 |
| 2006/0158421 A1 | 7/2006 | Masuko | |
| 2006/0164769 A1 | 7/2006 | Stanford et al. | |
| 2006/0164773 A1 | 7/2006 | Stanford et al. | |
| 2006/0164774 A1 | 7/2006 | Herbold et al. | |
| 2006/0176044 A1 | 8/2006 | Binder et al. | |
| 2008/0061752 A1 | 3/2008 | Heath | |

OTHER PUBLICATIONS

International Search Report for PCT/IL2009/000321 mailed Aug. 12, 2009, European Patent Office.

(Continued)

*Primary Examiner* — Jessica Han
(74) *Attorney, Agent, or Firm* — Simon Kahn

(57) ABSTRACT

A PSE configured to determine the end of the start up phase at the PD responsive to a condition of the voltage at the PSE output. In one particular embodiment, the startup phase end is determined responsive to a PSE output voltage within a predetermined range of the PSE input voltage. In another particular embodiment, the startup phase end is determined responsive to the voltage drop associated with the PSE current limiter being lower than a predetermined maximum. In yet another particular embodiment, the startup phase end is determined responsive to the absolute value of the rate of change of the PSE output voltage being lower than a predetermined value. In yet another particular embodiment, the startup phase end is determined responsive to the absolute value of the rate of change of the voltage drop associated with the PSE current limiter being lower than a predetermined value.

14 Claims, 5 Drawing Sheets

OTHER PUBLICATIONS

Written Opinion of International Searching Authority for PCT/IL2009/000321 mailed Aug. 12, 2009, European Patent Office.

IEEE Standards—8002.3af-2003, pp. 36-57 (sections 33.2.3.7-33.3.61), p. 94-96, p. 102, p. 115, published Jun. 18, 2003, New York.

* cited by examiner

METHOD AND APPARATUS FOR DETECTING END OF START UP PHASE

CROSS-REFERENCE TO RELATED APPLICATIONS

This application claims priority from U.S. Provisional Patent Application Ser. No. 61/039,831 filed Mar. 27, 2008 entitled "Method and Apparatus for Detecting End of Start Up Phase", the entire contents of which is incorporated herein by reference.

BACKGROUND OF THE INVENTION

The invention relates generally to the field of power over local area networks, particularly Ethernet based networks, and more particularly to detecting the end of a start up phase.

The growth of local and wide area networks based on Ethernet technology has been an important driver for cabling offices and homes with structured cabling systems having multiple twisted wire pairs. The structure cable is also known herein as communication cabling and typically comprises four twisted wire pairs. In certain networks only two twisted wire pairs are used for communication, with the other set of two twisted wire pairs being known as spare pairs. In other networks all four twisted wire pairs are used for communication. The ubiquitous local area network, and the equipment which operates thereon, has led to a situation where there is often a need to attach a network operated device for which power is to be advantageously supplied by the network over the network wiring. Supplying power over the network wiring has many advantages including, but not limited to; reduced cost of installation; centralized power and power back-up; and centralized security and management.

Several patents addressed to the issue of supplying power over an Ethernet based network exist including: U.S. Pat. No. 6,473,608 issued to Lehr et al.; and U.S. Pat. No. 6,643,566 issued to Lehr et al.; the contents of all of which are incorporated herein by reference.

The IEEE 802.3af-2003 standard, whose contents are incorporated herein by reference, is addressed to powering remote devices over an Ethernet based network. The above standard is limited to a powered device (PD) having a maximum power requirement during operation of 12.95 watts. Power can be delivered to the PD either directly from the switch/hub known as an endpoint power sourcing equipment (PSE) or alternatively via a midspan PSE. In either case power is delivered over a set of two twisted wire pairs.

The above mentioned standard defines certain electrical requirements applicable to normal powering, i.e. steady state operation, and separate limits for a start up phase. In particular, at Table 33-5 of the above standard, an output current limit during the startup phase, denoted $I_{Inrush}$, is defined separately from a maximum output current in normal powering mode, denoted $I_{port\_max}$. The startup phase is characterized by the initial charging of an input capacitor of the PD, which presents an effective short circuit across the PSE at startup. At the end of the startup phase, the input capacitor of the PD is effectively charged.

A PD according to the above mentioned specification exhibits certain characteristics including polarity independence, a detection resistance, an optional classification functionality, a minimum input capacitance, and a minimum turn on voltage. In the event of a PD input capacitance being greater than or equal to 180 µF, the PD is further operative to control the inrush current during startup mode so as to ensure a maximum $I_{inrush}$ of 400 mA. After detection and optional classification, the PD is not to close an isolating switch placing the input capacitance and load across the PSE until a minimum turn on voltage is detected by the PD.

The IEEE 802.3at DTE Power Enhancements Task Force is in the process of developing a standard exhibiting higher power limits than the above IEEE 802.3af-2003 standard. It is anticipated that an increased operating power will be supported over wire pairs during normal powering mode, i.e. once the startup phase has completed. It is further anticipated that little, if any change, is to be made to the current limits of the startup phase, i.e. $I_{Inrush}$, which is set at limits significantly lower than the anticipated normal powering mode current. Thus, before a PD under the IEEE 802.3at proposed standard can draw increased current, it must first ensure that the startup phase has been completed, and must further ensure that the PSE is aware of the end of the startup phase.

For example, in the event that the PD determines that the startup phase has completed while the PSE is still in the startup phase, the PD will attempt to draw increased current, consonant with the normal powering mode, while the PSE exhibits current limit $I_{Inrush}$. Such a condition will prevent proper operation of the PD, and may further result in increased stress at the PSE. A simple solution is to require a timer at the PD, which prevents the end of the startup phase from being determined before the expiration of a predetermined time period. A similar timer, with a slightly shorter predetermined time period, at the PSE would thus ensure that normal powering mode is achieved without being subject to $I_{Inrush}$. Unfortunately, such a requirement adds cost, requiring timers at both the PD and PSE.

What is needed, and not supplied by the prior art, is a means for determining, at the PSE, the end of the startup phase occurring at the PD.

SUMMARY OF THE INVENTION

According to certain embodiments of the present invention, a PSE is configured to determine the end of the start up phase at the PD responsive to a condition of the voltage at the PSE output.

In one particular embodiment, the end of the startup phase is determined at the PSE responsive to a PSE output voltage within a predetermined range of the PSE input voltage. In another particular embodiment, the end of the startup phase is determined at the PSE responsive to the voltage drop across the PSE current limiter, or the PSE current limiter and switch, being lower than a predetermined maximum. In yet another particular embodiment, the end of the startup phase is determined at the PSE responsive to the absolute value of the rate of change of the PSE output voltage being lower than a predetermined value, preferably for a predetermined amount of time. In yet another particular embodiment, the end of the startup phase is determined at the PSE responsive to the absolute value of the rate of change of the voltage drop across the PSE current limiter, or the PSE current limiter and switch, being lower than a predetermined value, preferably for a predetermined amount of time.

In one embodiment a power sourcing equipment is provided comprising: a voltage sensor; a control circuitry in communication with the voltage sensor; and a current limiter responsive to the control circuitry and operative to set a first current limit associated with a startup phase and a second current limit associated with a normal powering mode, wherein the control circuitry is operative responsive to a voltage condition sensed by the voltage sensor to set the current limit of the current limiter to one of the first current limit and the second current limit.

In one further embodiment the voltage sensor is arranged to sense a voltage associated with the output of the power sourcing equipment, and wherein the voltage condition is a predetermined minimum voltage. In one yet further embodiment, the predetermined minimum voltage is a predetermined maximum voltage drop from an input voltage.

In one further embodiment the voltage sensor is arranged to sense a voltage associated with the output of the power sourcing equipment, and wherein the voltage condition is a rate of change of the sensed output voltage whose absolute value is less than a predetermined value. In one yet further embodiment the rate of change of the absolute value less than the predetermined value is maintained for a predetermined time.

In one further embodiment the voltage sensor is arranged to sense a voltage drop associated with the current limiter, and wherein the voltage condition is a voltage drop less than a predetermined value. In one yet further embodiment the sensed voltage drop associated with the current limiter is one of the voltage drop across the current limiter and the voltage drop across the combination of the current limiter and an electronically controlled switch of the power sourcing equipment.

In one further embodiment the voltage sensor is arranged to sense a voltage drop associated with the current limiter, and wherein the voltage condition is a rate of change of the sensed voltage drop whose absolute value is less than a predetermined value. In one yet further embodiment the sensed voltage drop associated with the current limiting functionality is one of the voltage drop across the current limiter and the voltage drop across the combination of the current limiter and an electronically controlled switch of the power sourcing equipment. In one yet further embodiment, the rate of change of the absolute value less than the predetermined value is maintained for a predetermined time.

In one further embodiment the current limiter comprises a programmable current limiter. In another further embodiment the current limiter comprises a threshold current limiter.

Independently, in one embodiment a method of powering is provided, the method of powering comprising: providing a power source; providing power from the provided power source at a first current limit, the first current limit associated with a startup phase; sensing a voltage associated with the provided power source; and providing, responsive to a condition of the sensed voltage, power from the power source at a second current limit, the second current limit associated with a normal powering mode.

In one further embodiment the sensed voltage is a voltage associated with an output of the provided power source, and wherein the voltage condition is a predetermined minimum output voltage of the provided power source. In one yet further embodiment the predetermined minimum output voltage is a predetermined maximum voltage drop from an input voltage to the provided power source.

In one further embodiment the sensed voltage is a voltage associated with an output of the provided power source, and wherein the voltage condition is a rate of change of the sensed voltage whose absolute value is less than a predetermined value. In one yet further embodiment the rate of change of the absolute value less than the predetermined value is maintained for a predetermined time.

In one further embodiment the sensed voltage is a voltage drop associated with a current limiting functionality providing the first current limit, and wherein the voltage condition is a voltage drop less than a predetermined value. In one yet further embodiment the sensed voltage drop associated with the current limiting functionality is one of the voltage drop across the current limiting functionality and the voltage drop across the combination of the current limiting functionality and an electronically controlled switch of the provided power source.

In one further embodiment, the sensed voltage is a voltage drop associated with a current limiting functionality providing the first current limit, and wherein the voltage condition is a rate of change of the sensed voltage drop whose absolute value is less than a predetermined value. In one yet further embodiment the sensed voltage drop associated with the current limiting functionality is one of the voltage drop across the current limiting functionality and the voltage drop across the combination of the current limiting functionality and an electronically controlled switch of the provided power source. In one yet further embodiment, the rate of change whose absolute value is less than the predetermined value is maintained for a predetermined time.

Independently, in one embodiment a power sourcing equipment is provided comprising: a voltage sensor; a control circuitry in communication with the voltage sensor; and a current limiting functionality responsive to the control circuitry and operative to set a first current limit associated with a startup phase and a second current limit associated with a normal powering mode, wherein the control circuitry is operative responsive to a voltage condition sensed by the voltage sensor to set the current limit of the current limiting functionality to one of the first current limit and the second current limit. In one further embodiment the current limiting functionality comprises a threshold current limiter operative to allow the flow of current less than the set threshold current limit without appreciable resistance, and to limit the current so as to not exceed the set threshold current limit.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF THE PREFERRED EMBODIMENTS

Figure 1A:
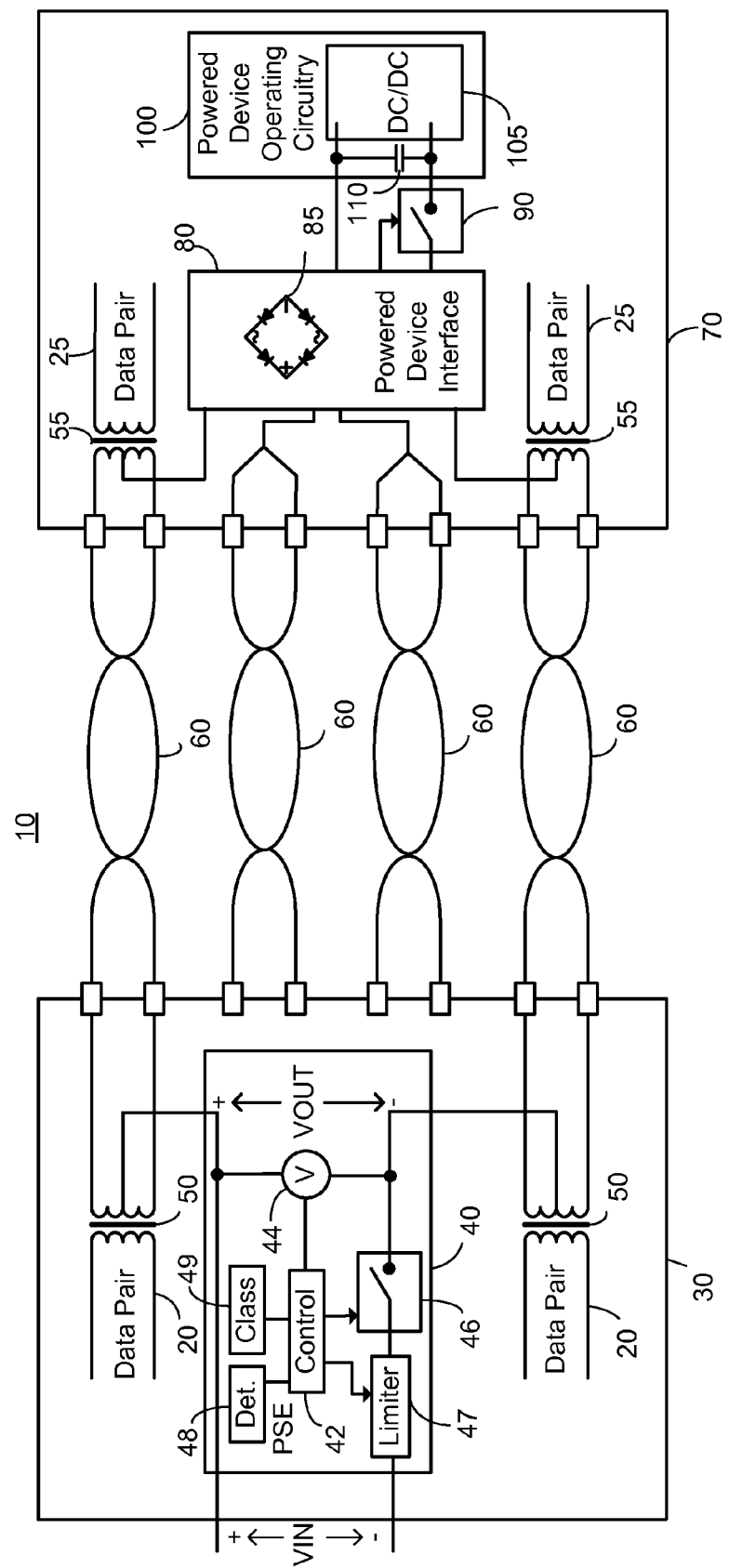
FIG. 1A illustrates a high level block diagram of a system for remote powering from an endpoint PSE arranged to determine the end of the start up phase of the PD at the PSE responsive to a condition of the output voltage in accordance with certain embodiments.

The present embodiments enable a PSE configured to determine the end of the start up phase at the PD responsive to a condition of the voltage at the PSE output.

In one particular embodiment, the end of the startup phase is determined at the PSE responsive to a PSE output voltage within a predetermined range of the PSE input voltage. In another particular embodiment, the end of the startup phase is determined at the PSE responsive to the voltage drop across the PSE current limiter, or the PSE current limiter and switch, being lower than a predetermined maximum. In yet another particular embodiment, the end of the startup phase is determined at the PSE responsive to the rate of change of the PSE output voltage being lower than a predetermined value, preferably for a predetermined amount of time. In yet another particular embodiment, the end of the startup phase is determined at the PSE responsive to the absolute value of the rate of change of the voltage drop across the PSE current limiter, or the PSE current limiter and switch, being lower than a predetermined value, preferably for a predetermined amount of time.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The invention is being described as an Ethernet based network, with a powered device being connected thereto, however this is not meant to be limiting in any way. The invention is equally applicable to any arrangement in which power is supplied to a target device, where it is important to identify the end of the start up phase.

FIG. 1A illustrates a high level block diagram of a system 10 providing remote powering from an endpoint PSE and arranged to determine the end of the start up phase of the PD at the PSE responsive to a condition of the output voltage, in accordance with certain embodiments. System 10 comprises: a switch/hub equipment 30 comprising a first and a second data pair 20, a PSE 40 comprising a control circuitry 42, a voltage sensor 44, an electronically controlled switch 46, a current limiting functionality 47, a detection functionality 48 and a classification functionality 49, and a first and a second data transformers 50; a first, a second, a third and a fourth twisted wire pair connection 60; and a powered end station 70 comprising a PD interface 80 preferably exhibiting a diode bridge 85, a first and a second data transformer 55, a first and a second data pair 25, an isolating switch 90, and a PD operating circuitry 100 comprising a DC/DC converter 105 and an input capacitor 110.

A positive power source lead of an input voltage, denoted VIN, is connected to a first input of voltage sensor 44 and the center tap of the secondary of first data transformer 50. A negative power source lead of input voltage VIN is connected to a first end of current limiting functionality 47, and a second end of current limiting functionality 47 is connected to a first end of electronically controlled switch 46. A second end of electronically controlled switch 46 is connected to a return input of voltage sensor 44 and the center tap of the secondary of second data transformer 50. A first output of control circuitry 42 is connected to the control input of electronically controlled switch 46, a second output of control circuitry 42 is connected to the control input of current limiting functionality 47, and the output of voltage sensor 44 is connected to an input of control circuitry 42. Each of detection functionality 48 and classification functionality 49 are in communication with control circuitry 42. The primary of first and second data transformers 50 are each connected to communication devices, represented by first and second data pairs 20. The output leads of the secondary of first and second data transformers 50 are each connected to a first end of first and second twisted wire pair connections 60, respectively. The second end of first and second twisted wire pair connections 60, are respectively connected to the primary of first and second data transformers 55 located within powered end station 70. The center taps of the primary of first and second data transformer 55 are connected respectively to a power input and return of PD interface 80. In a preferred embodiment, first and second data transformers 50 are part of PSE 40, and first and second data transformers 55 are part of PD interface 80. PD interface 80 preferably comprises diode bridge 85 arrange to ensure proper operation of powered end station 70 irrespective of the polarity of the connection to PSE 40. The output of PD interface 80 is connected via isolating switch 90 controlled by PD interface 80 to PD operating circuitry 100. The input to PD operating circuitry 100 is connected to DC/DC converter 105 and appears across input capacitor 110. The secondary of first and second data transformers 55 are each connected to communication devices, represented by first and second data pairs 25, respectively. Powered end station 70 is alternatively denoted PD 70.

Current limiting functionality 47 and electronically controlled switch 46 are illustrated as separate elements, however this is not meant to be limiting in any way. In an exemplary embodiment current limiting functionality 47 and electronically controlled switch 46 are implemented as a single FET and comparator circuit as described in U.S. Pat. No. 6,473,608 to Lehr et al incorporated by reference above. In one embodiment, current limiting functionality 47 is implemented by a current limiter, particularly a programmable current limiter. Current limiting functionality 47 is in one embodiment a threshold current limiter, operative to allow the flow of current less than the threshold level without appreciable resistance, and to effectively limit the current so as to not exceed the threshold level.

In operation, control circuitry 42 of PSE 40 detects powered end station 70 via detection functionality 48, optionally classifies powered end station 70 via classification functionality 49, and if power is available, supplies power over first and second twisted wire pair connection 60 to powered end station 70, by closing electronically controlled switch 46 thus supplying both power and data over first and second twisted wire pair connections 60. Third and fourth twisted wire pair connections 60 are not utilized, and are thus available as spare connections. Third and fourth twisted wire pair connections 60 are shown connected to PD interface 80 in order to allow operation alternatively over unused third and fourth twisted wire pair connections 60.

PD interface 80 functions to present a signature resistance to PSE 40, optionally present a classification current, and upon detection of a sufficient operating voltage, irrespective of polarity, to close isolating switch 90 thereby powering PD operating circuitry 100. DC/DC converter 105 is operative to convert the power received from PD interface 80 to an appropriate voltage to power PD operating circuitry 100 and exhibits input capacitor 110 across its input. Thus, upon the closing of isolating switch 90, input capacitor 110 is presented to PSE 40 through diode bridge 85, first and second data transformers 55 and first and second twisted wire pair connections 60.

Control circuitry 42 is further operative prior to closing electronically controlled switch to set current limiting functionality 47 to a first value, denoted I_INRUSH, and to receive an indication of the output port voltage, denoted VOUT, via voltage sensor 44 periodically during the start up phase. In one particular embodiment a voltage measurement of VOUT is taken every 2 μseconds after closing electronically controlled switch 46 until the end of the start up phase.

Control circuitry 42 is further operative to determine a voltage condition of VOUT indicative of the end of the startup phase responsive to the periodic indications of voltage sensor 44. In one particular embodiment, the voltage condition of VOUT is a minimum output voltage indicative that input capacitor 110 has charged to a nominal value. In another particular embodiment, the voltage condition is an output voltage within a predetermined range of the input voltage, VIN, indicating that the voltage drop across the combination of current limiting functionality 47 and electronically controlled switch 46 is less than a predetermined maximum. It is to be understood that a voltage drop across the combination of current limiting functionality 47 and electronically controlled switch 46 less than the predetermined maximum is indicative that current flow is less than I_INRUSH, thus indicative of the end of the startup phase. In yet another particular embodiment the rate of change of the output voltage, i.e. dv/dt, is determined, and the end of the startup phase is indicated by the absolute value of the rate of change of the output voltage being less than a predetermined value. Preferably, the end of the startup phase is determined after the absolute value of the rate of change of the output voltage is less than the predetermined value for a predetermined time period, so as to avoid false results.

Subsequent to control circuitry 42 determining the end of the startup phase, control circuitry 42 is further operative to set current limiting functionality 47 to a current limit associated with a normal powering mode. In certain embodiments, the current limit associated with the normal powering mode is a function of the classification obtained by classification functionality 49. In the event of power exceeding 15.4 Watts, the current limit associated with the normal powering mode is greater than I_INRUSH. As described above, in one embodiment the current limit is a current threshold limit, and current less than the threshold level flows without appreciable resistance from current limiting functionality 47, with current effectively limited so as to not exceed the threshold level. In such an embodiment, current limiting functionality 47 functions as a current governor.

Figure 1B:
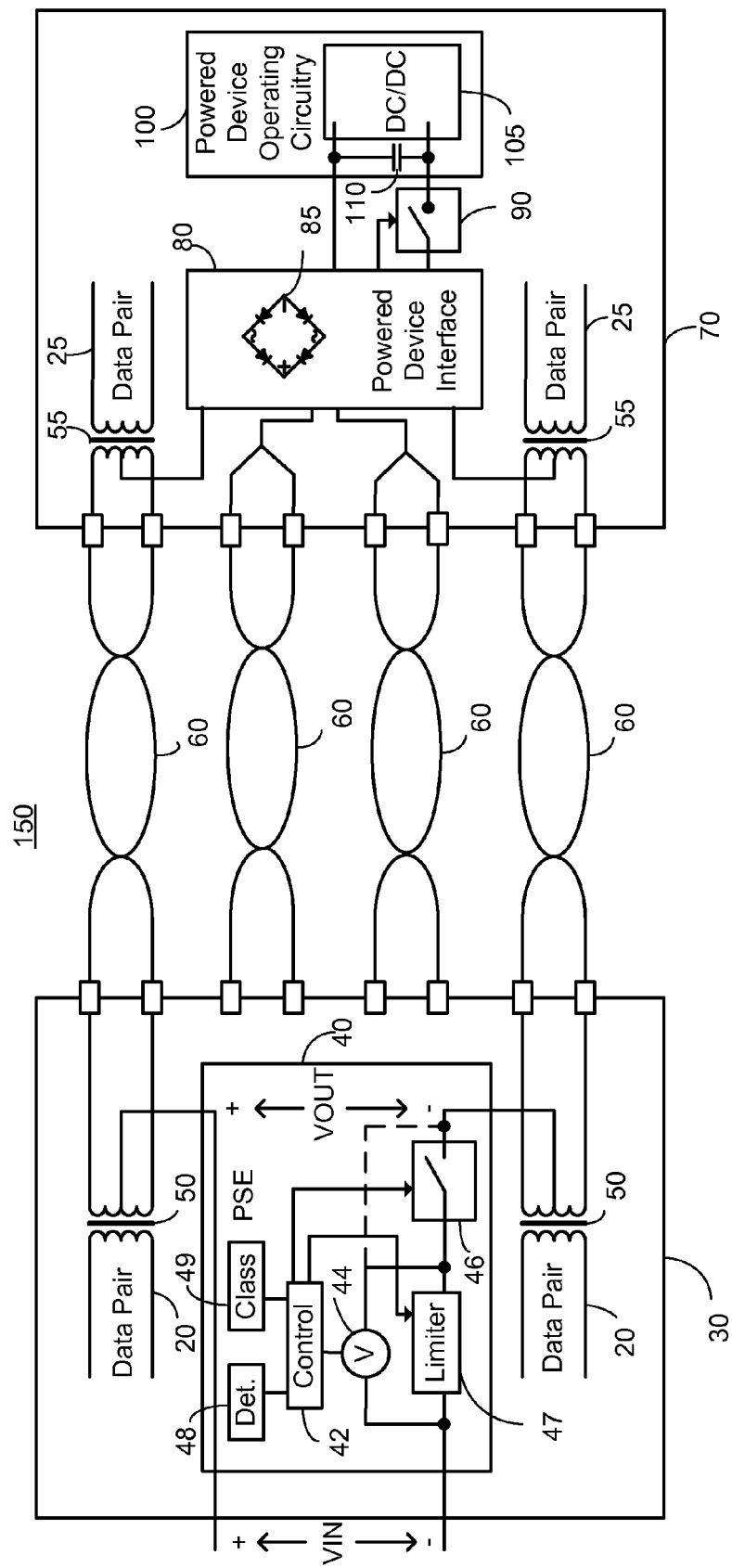
FIG. 1B illustrates a high level block diagram of a system for remote powering from an endpoint PSE arranged to determine the end of the start up phase of the PD at the PSE responsive to a condition of the voltage drop across the current limiting functionality in accordance with certain embodiments.

FIG. 1B illustrates a high level block diagram of a system 150 providing remote powering from an endpoint PSE and arranged to determine the end of the start up phase of the PD at the PSE responsive to a condition of the voltage drop across current limiting functionality 47, in accordance with certain embodiments. System 150 is in all respects similar to system 10, with the exception that voltage sensor 44 is arranged to provide an indication of the voltage drop across either current limiting functionality 47 or the combination of current limiting functionality 47 and electronically controlled switch 46.

In operation, control circuitry 42 of PSE 40 detects powered end station 70 via detection functionality 48, optionally classifies powered end station 70 via classification functionality 49, and if power is available, supplies power over first and second twisted wire pair connection 60 to powered end station 70, by closing electronically controlled switch 46 thus supplying both power and data over first and second twisted wire pair connections 60. Third and fourth twisted wire pair connections 60 are not utilized, and are thus available as spare connections. Third and fourth twisted wire pair connections 60 are shown connected to PD interface 80 in order to allow operation alternatively over unused third and fourth twisted wire pair connections 60.

PD interface 80 functions to present a signature resistance to PSE 40, optionally present a classification current, and upon detection of a sufficient operating voltage, irrespective of polarity, to close isolating switch 90 thereby powering PD operating circuitry 100. DC/DC converter 105 is operative to convert the power received from PD interface 80 to an appropriate voltage to power PD operating circuitry 100 and exhibits input capacitor 110 across its input. Thus, upon the closing of isolating switch 90, input capacitor 110 is presented to PSE 40 through diode bridge 85, first and second data transformers 55 and first and second twisted wire pair connections 60.

Control circuitry 42 is further operative prior to closing electronically controlled switch 46 to set current limiting functionality 47 to a first value, denoted I_INRUSH, and to receive an indication of the voltage drop across current limiting functionality 47, or the combination of current limiting functionality 47 and electronically controlled switch 46 periodically during the start up phase. In one particular embodiment a voltage measurement is taken every 2μ seconds after closing electronically controlled switch 46 until the end of the start up phase.

Control circuitry 42 is further operative to determine a voltage condition of the voltage drop across one of current limiting functionality 47 and the combination of current limiting functionality 47 and electronically controlled switch 46 indicative of the end of the startup phase responsive to the periodic indications of voltage sensor 44. In one particular embodiment, the voltage condition is a voltage drop less than a predetermined value, indicative that input capacitor 110 has charged to a nominal value and is no longer attempting to draw current substantially in excess of I_INRUSH. In another particular embodiment the rate of change of the voltage drop across one of current limiting functionality 47 and the combination of current limiting functionality 47 and electronically controlled switch 46, i.e. dv/dt, is determined, and the end of the startup phase is indicated by the absolute value of the rate of change of the voltage drop being less than a predetermined value. Preferably, the end of the startup phase is determined after the absolute value of the rate of change of the voltage drop is less than the predetermined value for a predetermined time period, so as to avoid false results.

Figure 2A:
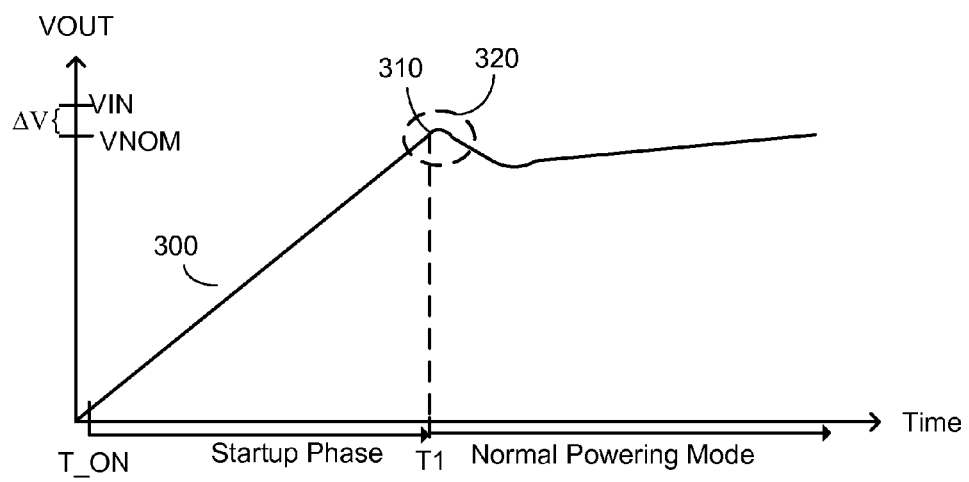
FIG. 2A illustrates a timing diagram of voltages of the system of FIG. 1A, from beginning of powering through the end of the startup phase, according to certain embodiments.
Figure 2B:
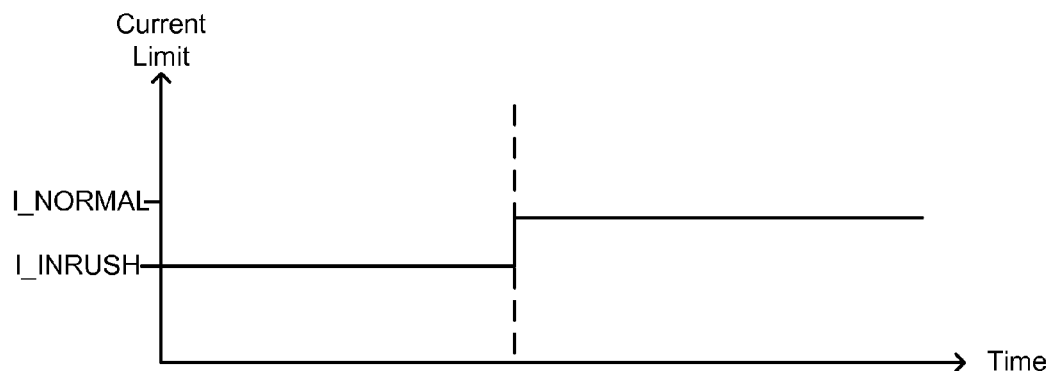
FIG. 2B illustrates a timing diagram of current limits applicable to current drawn from the PSE corresponding to the voltages of FIG. 2A, according to certain embodiments.

FIG. 2A illustrates a timing diagram of voltages of system 10 of FIG. 1A, from beginning of powering denoted T_ON, through the end of the startup phase, denoted T1, according to certain embodiments, in which the x-axis represents time and the y-axis represents PSE output port voltage, VOUT. FIG. 2B illustrates a timing diagram of current limits applicable to current drawn from PSE 40 corresponding to the voltages of FIG. 2A, according to certain embodiments.

At time T_ON, electronically controlled switch 46 is closed and the output port voltage of PSE 40 begins to rise, as shown by waveform 300, as input capacitor 110 is charged. The current limit of current limiting functionality 47 is set to I_INRUSH. Waveform 300 continues to rise monotonically, until it rises to VNOM, defined as a predetermined voltage ΔV below the input voltage, VIN. At point 310, corresponding to time T1, the output port voltage has reached VNOM, and control circuitry 42 determines the end of the startup phase, T1. Alternatively, as shown by an area 320, the rate of change of VOUT is monitored. When the absolute value of the rate of change of VOUT is less than a predetermined value, preferably for a predetermined amount of time, control circuitry 42 determines the end of the startup phase, T1. Control circuitry 42, responsive to the determined end of the startup phase, then changes the setting of current limiting functionality 47, to I_NORMAL, indicative of the normal powering mode. As indicated above, in one embodiment current limiting functionality 47 is a threshold current limiter, operative to allow the flow of current less than the set threshold level without appreciable resistance, and to effectively limit the current so as to not exceed the set threshold level. n such an embodiment, current limiting functionality 47 functions as a current governor.

Figure 3A:
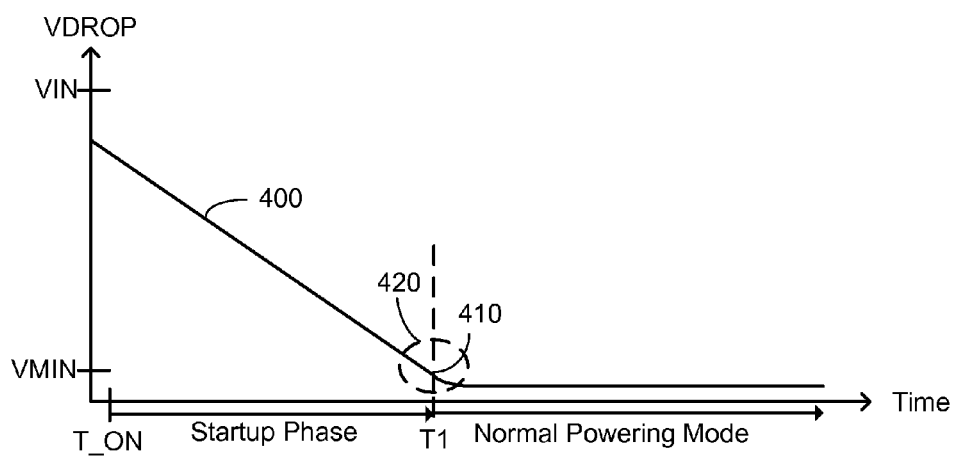
FIG. 3A illustrates a timing diagram of voltages of the system of FIG. 1B, from beginning of powering through the end of the startup phase, according to certain embodiments.
Figure 3B:
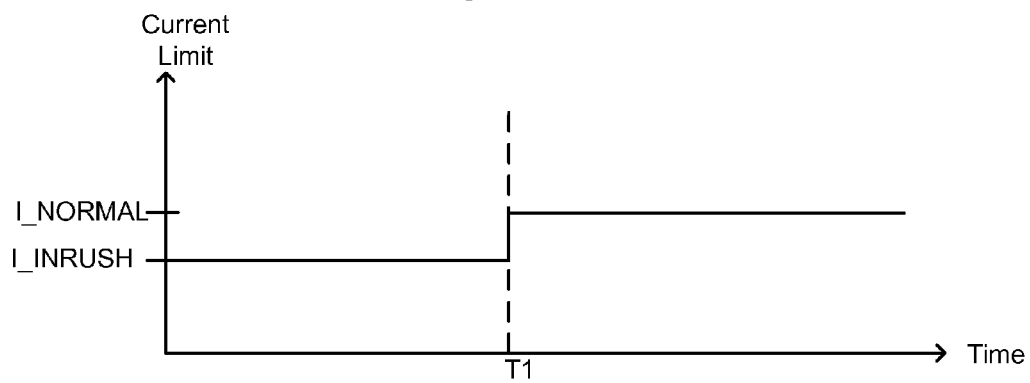
FIG. 3B illustrates a timing diagram of current limits applicable to current drawn from the PSE corresponding to the voltages of FIG. 3A, according to certain embodiments.

FIG. 3A illustrates a timing diagram of voltages of system 150 of FIG. 1B, from beginning of powering denoted T_ON, through the end of the startup phase, denoted T1, according to certain embodiments, in which the x-axis represents time and the y-axis represents the voltage drop across current limiting functionality 47. FIG. 3B illustrates a timing diagram of current limits applicable to current drawn from PSE 40, through current limiting functionality 47, corresponding to the voltages of FIG. 2A, according to certain embodiments.

At time T_ON, electronically controlled switch 46 is closed and the voltage drop across one of current limiting functionally 47 and the combination of current limiting functionality 47 and electronically controlled switch 46 begins to fall, as shown by waveform 400, as input capacitor 110 is charged and the voltage thereon rises towards VIN. The current limit of current limiting functionality 47 is set to I_INRUSH. Waveform 400 continues to fall monotonically, until it falls to VMIN, defined as a predetermined maximum voltage drop across one of current limiting functionality 47 and the combination of current limiting functionality 47 and electronically controlled switch 46, indicative that the current attempted to be drawn through current limiting functionality 47 is no longer substantially above I_INRUSH. At point 410, the voltage drop is below VMIN, and control circuitry 42 determines the end of the startup phase, T1. Alternatively, as shown by an area 420, the rate of change of the voltage drop across one of current limiting functionality 47 and the combination of current limiting functionality 47 and electronically controlled switch 46 is monitored. When the absolute value of the rate of change of the voltage drop across one of current limiting functionality 47 and the combination of current limiting functionality 47 and electronically controlled switch 46 is less than a predetermined value, preferably for a predetermined amount of time, control circuitry 42 determines the end of the startup phase, T1. Control circuitry 42, responsive to the determined end of the startup phase, then changes the setting of current limiting functionality 47, to I_NORMAL, indicative of the normal powering mode. As indicated above, in one embodiment current limiting functionality 47 is a threshold current limiter, operative to allow the flow of current less than the set threshold level without appreciable resistance, and to effectively limit the current so as to not exceed the set threshold level. In such an embodiment, current limiting functionality 47 functions as a current governor.

Figure 4:
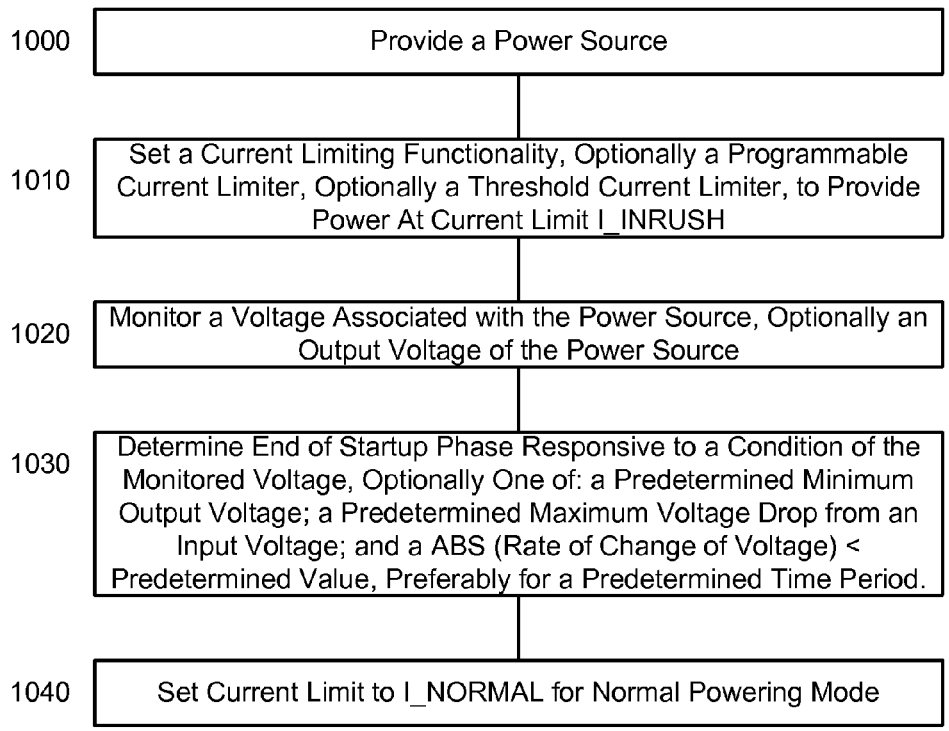
FIG. 4 illustrates a high level flow chart of the operation of the PSE of FIG. 1A to determine the end of the startup phase and enable powering of the normal operating mode at a different current limit, according to certain embodiments.

FIG. 4 illustrates a high level flow chart of the operation of PSE 40 of FIG. 1A to determine the end of the startup phase and enable powering of the normal operating mode at a different current limit, according to certain embodiments. In stage 1000, PSE 40 is provided, preferably receiving an input voltage, VIN, and arranged to supply a device having an input capacitor exhibiting an inrush current, such as input capacitor 110, thereby exhibiting a startup phase.

In stage 1010, a current limiting functionality of the provided power source of stage 1000 is set to inrush current limit, I_INRUSH. In one embodiment, the current limiting functionality is a programmable current limiter, as described above in relation to current limiting functionality 47. In another embodiment, the current limiting functionality is a threshold current limiting functionality. In yet another embodiment, the current limiting functionality is a programmable current limiter exhibiting a threshold current limiting functionality. In stage 1020, a voltage associated with the power source of stage 1000 is monitored. Optionally the voltage monitored is the output port voltage, VOUT, of the power source of stage 1000.

In stage 1030, the end of the startup phase is determined responsive to a condition of the monitored voltage of stage 1020. In one embodiment, the condition of the monitored voltage is a predetermined minimum output voltage, VOUT. In another embodiment, the condition of the monitored voltage is a predetermined maximum voltage drop from an input voltage. In yet another embodiment, the condition of the monitored voltage is a rate of change whose absolute value is less than a predetermined value, preferably maintained for a predetermined time period.

In stage 1040, responsive the determined end of the startup phase of stage 1030, current limiting functionality 47 is set to I_NORMAL, i.e. a current limit associated with a normal powering mode.

Figure 5:
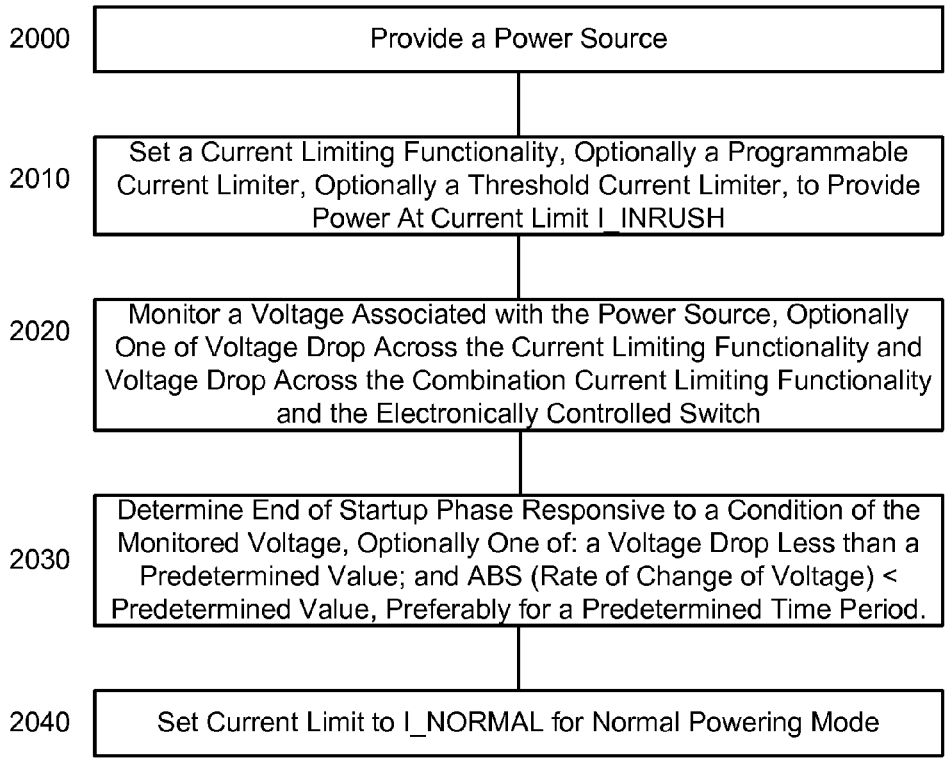
FIG. 5 illustrates a high level flow chart of the operation of the PSE of FIG. 1B to determine the end of the startup phase and enable powering of the normal operating mode at a different current limit, according to certain embodiments.

FIG. 5 illustrates a high level flow chart of the operation of PSE 40 of FIG. 1B to determine the end of the startup phase and enable powering of the normal operating mode at a different current limit, according to certain embodiments. In stage 1000, PSE 40 is provided, preferably receiving an input voltage, VIN, and arranged to supply a device having an inrush current, such as input capacitor 110, thereby exhibiting a startup phase.

In stage 2010, a current limiting functionality of the provided power source of stage 2000 is set to inrush current limit, I_INRUSH. In one embodiment, the current limiting functionality is a programmable current limiter, as described above in relation to current limiting functionality 47. In another embodiment, the current limiting functionality is a threshold current limiting functionality. In yet another embodiment, the current limiting functionality is a programmable current limiter exhibiting a threshold current limiting functionality. In stage 2020, a voltage associated with the power source of stage 2000 is monitored. Optionally, the voltage monitored is one of: the voltage drop across current limiting functionality 47 of the power source of stage 2000; and the voltage drop across the combination of current limiting functionality 47 and electronically controlled switch 46 of the power source of stage 2000.

In stage 2030, the end of the startup phase is determined responsive to a condition of the monitored voltage of stage 2020. In one embodiment, the condition of the monitored voltage is a voltage drop less than a predetermined value. In another embodiment, the condition of the monitored voltage drop is a rate of change whose absolute value is less than a predetermined value, preferably maintained for a predetermined time period.

In stage 2040, responsive to the determined end of the startup phase of stage 2030, current limiting functionality 47 is set to I_NORMAL, i.e. a current limit associated with a normal powering mode.

Thus the present embodiments enable a PSE configured to determine the end of the start up phase at the PD responsive to a condition of the voltage at the PSE output.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination. In particular, the invention has been described with an identification of each powered device by a class, however this is not meant to be limiting in any way. In an alternative embodiment, all powered devices are treated equally, and thus the identification of class with its associated power requirements is not required.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

I claim:

1. A power sourcing equipment comprising:
   a voltage sensor arranged to sense a voltage associated with the output of the power sourcing equipment;
   a control circuitry in communication with said voltage sensor; and
   a current limiter responsive to said control circuitry and arranged to set a first current limit associated with a startup phase and a second current limit associated with a normal powering mode,
   wherein said control circuitry is arranged responsive to a voltage condition sensed by said voltage sensor to set the current limit of said current limiter to one of said first current limit and said second current limit and wherein said voltage condition is a rate of change of the sensed output voltage whose absolute value is less than a predetermined value.

2. A power sourcing equipment according to claim 1, wherein said rate of change of said absolute value less than said predetermined value is maintained for a predetermined time.

3. A power sourcing equipment comprising:
   a voltage sensor;
   a control circuitry in communication with said voltage sensor; and
   a current limiter responsive to said control circuitry and arranged to set a first current limit associated with a startup phase and a second current limit associated with a normal powering mode,
   wherein said voltage sensor is arranged to sense a voltage drop associated with said current limiter,
   wherein said control circuitry is arranged responsive to a voltage condition sensed by said voltage sensor to set the current limit of said current limiter to one of said first current limit and said second current limit, and
   wherein said voltage condition is a rate of change of the sensed voltage drop whose absolute value is less than a predetermined value.

4. A power sourcing equipment according to claim 3, wherein said sensed voltage drop associated with said current limiting functionality is one of the voltage drop across said current limiter and the voltage drop across the combination of said current limiter and an electronically controlled switch of the power sourcing equipment.

5. A power sourcing equipment according to claim 3, wherein said rate of change of said absolute value less than said predetermined value is maintained for a predetermined time.

6. A method of powering, comprising:
   providing a power source;
   providing power from said provided power source at a first current limit, said first current limit associated with a startup phase;
   sensing a voltage associated with said provided power source, wherein said sensed voltage is a voltage associated with an output of said provided power source; and
   providing, responsive to a condition of said sensed voltage, power from the power source at a second current limit, said second current limit associated with a normal powering mode, and wherein said voltage condition is a rate of change of the sensed voltage whose absolute value is less than a predetermined value.

7. A method according to claim 6, wherein said rate of change of said absolute value less than said predetermined value is maintained for a predetermined time.

8. A method of powering, comprising:
   providing a power source;
   providing power from said provided power source at a first current limit, said first current limit associated with a startup phase;
   sensing a voltage associated with said provided power source, wherein said sensed voltage is a voltage drop associated with a current limiting functionality providing said first current limit; and
   providing, responsive to a condition of said sensed voltage, power from the power source at a second current limit, said second current limit associated with a normal powering mode, and wherein said voltage condition is a rate of change of the sensed voltage drop whose absolute value is less than a predetermined value.

9. A method according to claim 8, wherein said sensed voltage drop associated with said current limiting functionality is one of the voltage drop across said current limiting functionality and the voltage drop across the combination of said current limiting functionality and an electronically controlled switch of the provided power source.

10. A method according to claim 8, wherein said rate of change whose absolute value is less than said predetermined value is maintained for a predetermined time.

11. A power sourcing equipment comprising:
a voltage sensor;
a control circuitry in communication with said voltage sensor; and
a current limiting functionality responsive to said control circuitry and arranged to set a first current limit associated with a startup phase and a second current limit associated with a normal powering mode,
wherein said control circuitry is arranged responsive to a voltage condition sensed by said voltage sensor to set the current limit of said current limiting functionality to one of said first current limit and said second current limit, wherein said voltage condition is a rate of change of voltage less than a predetermined value.

12. A power sourcing equipment according to claim 11, wherein said current limiting functionality comprises a threshold current limiter operative to allow the flow of current less than the set threshold current limit without appreciable resistance, and to limit the current so as to not exceed the set threshold current limit.

13. A power sourcing equipment according to claim 11, wherein said voltage sensor is arranged to sense a voltage drop associated with said current limiting.

14. A power sourcing equipment according to claim 11, wherein said voltage sensor is arranged to sense a voltage associated with the output of the power sourcing equipment.

* * * * *